3,178,898
PROCESS FOR THE STORAGE OF OZONE
Paul Dognin, Paris, and Alain Kerrels, Bagneux, France, assignors to L'Air Liquide, Societe Anonyme pour l'Etude et l'Exploitation des Procedes Georges Claude
Filed Feb. 13, 1963, Ser. No. 258,250
Claims priority, application France, Feb. 22, 1962, 888,859, Patent 1,246,273
3 Claims. (Cl. 62—48)

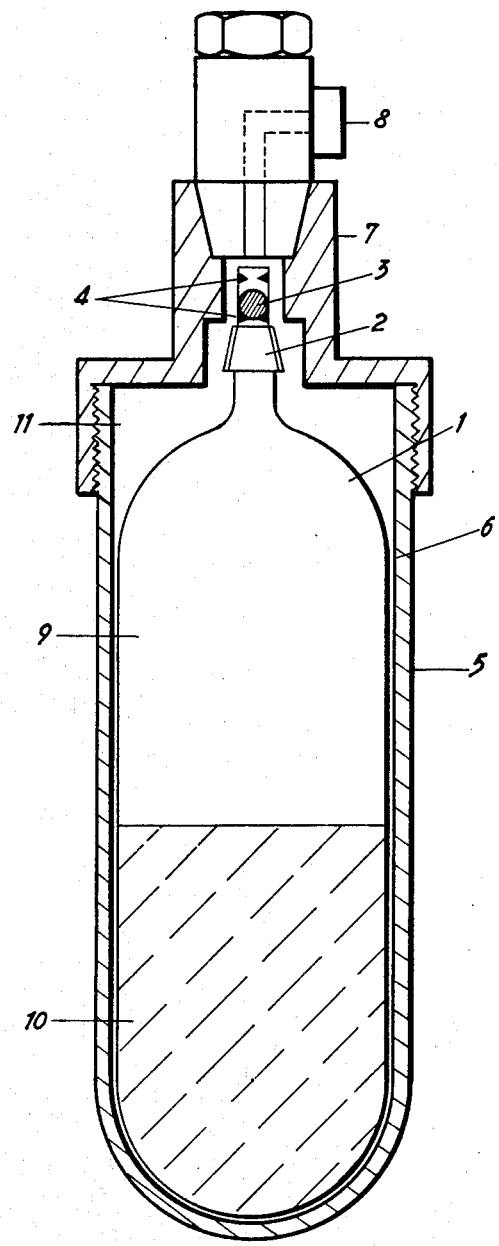

French Patent No. 1,246,273 of October 6, 1959, contains a description of a method for the preservation of ozone under a comparatively stable and if desired fairly concentrated form, through low-temperature dissolution (e.g. below —100° C.) in a liquid fluorinated hydrocarbon, preferably in a fluorochloromethane.

The ozone thus dissolved can thereafter be preserved in its solution at low temperature, with but very slow decomposition. At the time of use, the ozone is allowed to evaporate through progressive warming up of its solution. This procedure requires that the solution of ozone be kept in a vessel provided with a highly efficient insulating medium, owing to the large temperature differential between the solution of ozone and the surrounding medium.

According to an improvement which was the subject of the first certificate of addition No. 78,509 to the above-mentioned French patent, the solution of ozone is introduced into a pressure-resisting vessel, which is closed before it is allowed to rise to room temperature.

The present inmprovement is characterised in that the vessel into which the low-temperature solution is introduced is a glass phial with a bursting strength lower than the maximum, internal pressure reached after the rise to room temperature, which is itself contained in a metal vessel resisting to that maximum inside pressure, and the outside surface of the glass phial is constantly subjected to a balancing counter-pressure, which is progressively raised as the temperature of the solution rises, so that it never differs from the inside pressure by more than the bursting strength of the glass phial.

It has been found that the stability of the ozone thus stored remains quite good, and allows it to be preserved for several weeks.

The temperature rise produces at least partial vaporizatition of the ozone from its solvent. Two phases are formed inside the vessel under pressure. The liquid phase includes the monochlorotrifluoromethane—to be called hereafter "Freon 13" or "CF 13"—in the liquid state, with dissolved ozone. The gas phase includes the "Freon 13" under its vapour pressure a troom temperature, and ozone gas in equilibrium with the dissolved ozone. The vapour pressure of the "Freon 13" used as a solvent is 30.6 atmospheres at room temperature. The partial pressure of the ozone in the vapour phase can reach several atmospheres.

It is well known that the best storage material for ozone is glass, because of its very low catalytic action on the decomposition of that gas. However, the preservation of ozone in glass phials seemed impossible to achieve under normal conditions, owing to the brittleness of glass, which explodes when subjected to a pressure higher than its brusting strength.

The present improvement makes it possible to preserve ozone in a material which has no appreciable effect on the stability of that gas, i.e. glass, protected externally by a closed metal vessel, thus allowing convenient storage and ready handling when the gas is used.

Investigations on the development of pressure inside the vessel containing the ozone, versus the rise of temperature show that the maximum total pressure is far greater than the bursting strength of the glass. The present improvement makes it possible to avoid every risk of breakage of the glass phial by constantly exerting on its outside wall a balancing counter-pressure which differs from the pressure inside the phial by less than the brusting strength of the glass. The balancing counter-pressure is progressively increased as the temperature inside the phial rises, according to about the same law as the inside pressure. The balancing counter-pressure exerted on the outside wall of the glass phial is preferably controlled automatically by the ozone contained in the phial, through a valve, for instance a ground-glass ball valve. During the vaporization phase, i.e. when the flask has been filled at low temperature and closed and the vessel is allowed to rise to room temperature, the valve allows gas to escape and a balancing counter-pressure is automatically created, which prevents the breakage of the glass phial. Any return of the decomposed gas into the phial is prevented by the decomposition of a small amount of ozone through contact with the walls of the flask, which tends to close the ground-glass ball valve.

As a non-limitative example, an ozone storage device, which may be carried out according to various embodiments, is described hereafter.

According to the drawing, the apparatus includes a glass phial 1 containing the ozone dissolved in the "Freon 13," or liquid phase 10, and the gas phase 9, consisting of "Freon 13" under its vapour pressure at room temperature and of ozone gas in equilibrium with the dissolved ozone. The top of the glass phial is connected, through a ground-glass stopper 2, to a valve 4, which is sensitive to a comparatively small pressure differential, and which controls the balancing counter-pressure 11. This valve 4 includes a ground-glass ball 3. The above-described glass phial is placed inside a metal flask 5, the inside cylindrical surface of which has essentially the same shape as the outside surface of the phial and is covered with a plastic coating, preferably made of polytetrafluoroethylene, which damps the glass-metal contact. A detachable cap 7, fitted with a cock 8 and connected if desired to an ozone relief valve with gauge, is fastened to the body of the flask.

The filling of the flask includes the operations of loading and sealing the glass phial. The open phial, contained in the capless flask, is loaded in the cold, as customary with solutions of ozone in trifluorochloromethane, according to French Patent No. 1,246,273 of October 6, 1959 and its first certificate of addition No. 78,509. Alternatively, the phial may be loaded separately, at low temperature, then quickly placed inside the metal flask, always in the cold.

When the gas is to be used, all that is required is to open the cock of the metal flask and at that moment, the balancing pressure outside the glass phial causes ozone-rich gas to escape. Under such conditions of storage, the glass phial may be recovered after each filling.

The storage device according to this invention may be carried out according to another embodiment.

The flask is filled as above, but after the solution of ozone in "Freon 13" has been introduced, the phial is sealed under atmospheric pressure, then introduced into a metal flask, identical to the one in the first embodiment, and sealed off.

When the gas is to be used, all that is required to obtain the ozone contained in the glass phial is to open slowly the relief valve of the flask. Under a certain pressure differential, which can reach 35 kg./cm.$^2$ (500 p.s.i.), the phial explodes and the relief valve is then closed. At that moment, the ozone contacts the walls of the metal flask. The chlorofluorinated polymer coating of the flask is meant to limit the rate of decomposition of the ozone after the glass phial has burst. The ozonized gas mixture is then used in the conventional manner.

What we claim is:

1. A device for the storage under a comparatively stable and if desired, fairly concentrated form of a solution of ozone in a liquid fluorinated hydrocarbon previously introduced into said device at a low temperature, said storage occurring during the rise of the temperature of said solution to room temperature and at room temperature, comprising a sealed glass phial containing the solution of ozone, said phial having a bursting strength lower than the maximum internal pressure reached after the rise to room temperature, contained in a metal flask resisting to the same internal pressure, the said flask including a cylindrical body with an inside plastic coating, the inside surface of said cylindrical body having the same shape as the outside surface of the said glass phial, and a detachable cap fitted with a cock and fastened to the body of the said flask, and means for constantly subjecting the outside surface of the glass phial to a balancing gaseous counter-pressure which raises progressively as the temperature of the solution rises, so as never to differ from the inside pressure by more than the bursting strength of the said glass phial.

2. An ozone storage device according to claim 1, wherein said means for introducing a gas inside the metal flask and outside the phial, for automatic control of the balancing counter-pressure on the outside wall of the glass phial, are a valve placed at the top of the said phial and sensitive to a comparatively small pressure differential.

3. An ozone storage device according to claim 2, wherein said valve is a ground-glass valve, connected through a ground-glass stopper to the glass phial containing the gas.

References Cited by the Examiner
UNITED STATES PATENTS

| | | | |
|---|---|---|---|
| 339,885 | 4/86 | Hill | 220—9 |
| 662,217 | 11/00 | Brady | 62—54 |
| 2,195,077 | 3/40 | Brown | 62—54 |
| 2,992,540 | 7/61 | Grosse et al. | 62—48 |

FOREIGN PATENTS 1,246,273  10/60  France.

OTHER REFERENCES

"Chemical Week," vol. 91, No. 21, Nov. 24, 1962, article on page 60, "Ozone in a Bottle" relied on.

ROBERT A. O'LEARY, *Primary Examiner.*